(12) United States Patent
Wang

(10) Patent No.: US 9,800,543 B2
(45) Date of Patent: Oct. 24, 2017

(54) METHOD AND DEVICE FOR FORWARDING PACKET

(71) Applicant: ZTE Corporation, Shenzhen (CN)

(72) Inventor: Jun Wang, Shenzhen (CN)

(73) Assignee: XI'AN ZHONGXING NEW SOFTWARE CO. LTD, Xi'an (CN)

( * ) Notice: Subject to any disclaimer, the term of this patent is extended or adjusted under 35 U.S.C. 154(b) by 72 days.

(21) Appl. No.: 14/893,906

(22) PCT Filed: Apr. 21, 2014

(86) PCT No.: PCT/CN2014/075846
§ 371 (c)(1),
(2) Date: Nov. 24, 2015

(87) PCT Pub. No.: WO2014/187212
PCT Pub. Date: Nov. 27, 2014

(65) Prior Publication Data
US 2016/0134587 A1 May 12, 2016

(30) Foreign Application Priority Data
May 24, 2013 (CN) .......................... 2013 1 0198760

(51) Int. Cl.
*H04L 29/12* (2006.01)
(52) U.S. Cl.
CPC ...... *H04L 61/2514* (2013.01); *H04L 61/2517* (2013.01)
(58) Field of Classification Search
CPC ..................... H04L 61/2514; H04L 61/2517
See application file for complete search history.

(56) References Cited

U.S. PATENT DOCUMENTS

2004/0132451 A1* 7/2004 Butehorn ............. H04B 7/1856
                                                            455/445
2005/0063393 A1    3/2005 Lin
(Continued)

FOREIGN PATENT DOCUMENTS

| CN | 101179477 A | 5/2008 |
| CN | 101800690 A | 8/2010 |
| CN | 102480530 A | 5/2012 |

OTHER PUBLICATIONS

International Search Report issued Jul. 1, 2014 re: Application No. PCT/CN2014/075846; pp. 1-2; citing: CN 102480530 A, CN 101179477 A, CN 101800690 A and US 2005063393 A1.
(Continued)

*Primary Examiner* — Ajay Cattungal
(74) *Attorney, Agent, or Firm* — Cantor Colburn LLP

(57) ABSTRACT

Provided is a method for forwarding a packet, which includes that: when a matched network address port group translation entry is found according to a source Internet Protocol (IP) address and a source port number of a received packet, or according to a target IP address and a target port number of the received packet, the packet is translated according to the network address port group translation entry and then sent out. Also provided is a device for forwarding a packet. By adopting the solution, memory resources occupied by static configuration Network Address Port Translation (NAPT) rules and entries can be reduced, maintenance can be facilitated, and configurations can be reduced effectively.

10 Claims, 2 Drawing Sheets

(56) References Cited

U.S. PATENT DOCUMENTS

| | | | | |
|---|---|---|---|---|
| 2005/0105524 | A1* | 5/2005 | Stevens | H04L 45/04 370/389 |
| 2006/0056297 | A1* | 3/2006 | Bryson | H04L 63/104 370/230 |
| 2006/0256801 | A1* | 11/2006 | Endo | H04L 12/66 370/401 |
| 2013/0132531 | A1* | 5/2013 | Koponen | H04L 41/0823 709/220 |
| 2013/0279519 | A1* | 10/2013 | Lu | H04L 61/2514 370/467 |

OTHER PUBLICATIONS

Written Opinion issued Jul. 1, 2014 re: Application No. PCT/CN2014/075846; pp. 1-21; citing: CN 102480530 A.

Anonymous: "How to Forward Ports on Your Router", XP055270316; Jun. 17, 2011; Retrieved form the Internet: URL: http://ww.howtogeek.com/66214/how-to-forward-ports-on-your-router/[retrieved on May 3, 2016]; pp. 6

Cheng Huawei Technologies D: "NAT44 ith Pre-allocated Ports: draft-cheng-behave-nat44-pre-allocated-ports-01.txt", Internet Engineering Task Force, IETF; XP01507189, Oct. 12, 2012, pp. 1-10; [Retrieved on Oct. 12, 2010].

Donley C Grundemann: "Deterministic Address Mapping to Reduce Logging in Carrier Grade Nat Deploments; Draft-Donley-Behave-Deterministic-CGN-05.txt", Jan. 12, 2013, XP015089453; pp. 1-15; [Retrieved on Jan. 12, 2013].

Meng ZTE Corporation W: "Network Address Port Group Translator; draft-meng-behave-napgt-01.txt", Jul. 15, 2013, XP015094009, pp. 1-4; [retrieved on Jul. 15, 2013].

Srisuresh Jasmine Networks K Egevang Intel Corporation P: Traditional IP Network Address Translator, Task Force, IETF, CH, Jan. 1, 2001, XP015008805, ISSN:0000-0003: pp. 17.

Supplementary European Search Report EP Application No. EP14801830, Dated May 3, 2016; pp. 9.

* cited by examiner

METHOD AND DEVICE FOR FORWARDING PACKET

TECHNICAL FIELD

The present disclosure relates to an address translation technology in the field of mobile communications, and in particular to a method and device for forwarding a packet.

BACKGROUND

Network Address Port Translation (NAPT) is a commonly known packet translation mode, which is commonly used for an access device, and can hide a small or medium sized network behind a legal Internet Protocol (IP) address. The main advantage of the NAPT is being able to use a globally effective IP address to implement universality.

However, in building of access to an extranet which requires keeping a consistent port mapping between an intranet and the extranet, it is necessary to adopt the static NAPT to set the port mappings between the extranet and the intranet one by one. Thus, the problems that too many resources are occupied by static configurations, it is very inconvenient to maintain manually and session resources are occupied will arise.

SUMMARY

In view of at least one of the above problems, the embodiments of the present disclosure provide a method and device for forwarding a packet, which can reduce resources occupied by statically configured NAPT rules and entries, facilitate maintenance and/or reduce resources occupied by sessions.

The technical solutions of the embodiments of the present disclosure are implemented as follows.

A method for forwarding a packet is provided, which includes that:

when a matched network address port group translation entry is found according to a source IP address and a source port number of a received packet, or according to a target IP address and a target port number of the received packet, the packet is translated according to the network address port group translation entry and then sent out.

In the above solution, the network address port group translation entry is: a mapping relationship established between an IP address of an intranet and an IP address of an extranet, with one port number or a port number range corresponding to the IP address of the intranet being the same as and in one-to-one correspondence with one port number or a port number range corresponding to the IP address of the extranet.

In the above solution, when the matched network address port group translation entry is found according to the source IP address and the source port number of the received packet, or according to the target IP address and the target port number of the received packet, translating the packet according to the network address port group translation entry includes that:

when the packet sent from the intranet to the extranet is received, the source IP address and the source port number of the packet are extracted, and it is checked whether there is the matched network address port group translation entry according to the source IP address and the source port number of the packet; when the matched network address port group translation entry is found, the packet is translated according to the matched network address port group translation entry; when the matched network address port group translation entry is not found, a network address port group translation entry is created according to a network address port group translation rule, and the packet is translated according to the created network address port group translation entry;

when the packet sent from the extranet to the intranet is received, the target IP address and the target port number of the packet are extracted, and it is checked whether there is the matched network address port group translation entry according to the target IP address and the target port number of the packet; when the matched network address port group translation entry is found, the packet is translated according to the matched network address port group translation entry; when the matched network address port group translation entry is not found, the packet is discarded or other processing is implemented.

In the above solution, the network address port group translation rule is that:

a specified IP address of the intranet and one port number or a port number range corresponding to the specified IP address of the intranet are statically translated to a specified IP address of the extranet and one port number or a port number range which are the same as the one port number or the port number range of the intranet;

or, a specified IP address corresponding to one type of packets in the intranet and one port number or a port number range corresponding to the specified IP address are dynamically translated to any IP address in a specified IP address pool of the extranet and one port number or a port number range which are the same as the one port number or the port number range of the intranet.

In the above solution, checking whether there is the matched network address port group translation entry according to the source IP address and the source port number of the packet includes that:

when the source IP address of the packet is the same as the IP address of the intranet in any network address port group translation entry, and the source port number of the packet is the same as the one port number or within the port number range of the intranet in the network address port group translation entry, then it is determined that the matched network address port group translation entry of the packet is found.

In the above solution, checking whether there is the matched network address port group translation entry according to the target IP address and the target port number of the packet includes that:

when the target IP address of the packet is the same as the IP address of the extranet in any network address port group translation entry, and the target port number of the packet is the same as the one port number or within the port number range of the extranet in the network address port group translation entry, then it is determined that the matched network address port group translation entry of the packet is found.

In the above solution, translating the packet according to the network address port group translation entry includes that:

when the packet sent from the intranet to the extranet is received, the source IP address of the packet is translated to the IP address of the extranet in the network address port group translation entry, and the source port number is kept unchanged;

when the packet sent from the extranet to the intranet is received, the target IP address of the packet is translated to the IP address of the intranet in the network address port group translation entry, and the target port number is kept unchanged.

A device for forwarding a packet is also provided, which includes: a matching and translation component, a network address port group component and a receiving and sending component; wherein, the matching and translation component is configured to, when a corresponding network address port group translation entry is found from the network address port group component according to a source IP address and a source port number of a received packet, or according to a target IP address and a target port number of the received packet, translate the packet according to the network address port group translation entry, and send the translated packet to the receiving and sending component;

the network address port group component is configured to provide the network address port group translation entry for the matching and translation component according to the network address port group translation rule;

the receiving and sending component is configured to send the translated packet which is sent from the matching and translation component.

In the above solution, the network address port group component is configured to save, as the network address port group translation entry, a mapping relationship established between an IP address of an intranet and an IP address of an extranet, with one port number or a port number range corresponding to the IP address of the intranet being the same as and in one-to-one correspondence with one port number or a port number range corresponding to the IP address of the extranet.

In the above solution, the matching and translation component is configured to, when the packet sent from the intranet to the extranet is received, extract the source IP address and the source port number of the packet, and check whether there is the matched network address port group translation entry in the network address port group component according to the source IP address and the source port number of the packet, when the matched network address port group translation entry is found, translate the packet according to the matched network address port group translation entry; when the matched network address port group translation entry is not found, create a network address port group translation entry according to the network address port group translation rule and save the created network address port group translation entry in the network address port group component, and translate the packet according to the created network address port group translation entry;

the matching and translation component is configured to, when the packet sent from the extranet to the intranet is received, extract the target IP address and the target port number of the packet, and check whether there is the matched network address port group translation entry in the network address port group component according to the target IP address and the target port number of the packet, when the matched network address port group translation entry is found, translate the packet according to the matched network address port group translation entry; when the matched network address port group translation entry is not found, discard the packet or implement other processing.

In the above solution, the network address port group component is configured to save the network address port group translation rule;

the network address port group translation rule is that: a specified IP address of the intranet and one port number or a port number range corresponding to the specified IP address of the intranet are statically translated to a specified IP address of the extranet and one port number or a port number range which are the same as the one port number or the port number range of the intranet;

or, a specified IP address corresponding to one type of packets in the intranet and one port number or a port number range corresponding to the specified IP address are dynamically translated to any IP address in a specified IP address pool of the extranet and one port number or a port number range which are the same as the one port number or the port number range of the intranet.

In the above solution, the matching and translation component is configured to, when the source IP address of the packet is the same as the IP address of the intranet in any network address port group translation entry of the network address port group component, and the source port number of the packet is the same as the one port number or within the port number range of the intranet in the network address port group translation entry, determine that the matched network address port group translation entry of the packet is found.

In the above solution, the matching and translation component is configured to, when the target IP address of the packet is the same as the IP address of the extranet in any network address port group translation entry of the network address port group component, and the target port number of the packet is the same as the one port number or within the port number range of the extranet in the network address port group translation entry, determine that the matched network address port group translation entry of the packet is found.

In the above solution, the matching and translation component is configured to, when the packet sent from the intranet to the extranet is received, translate the source IP address of the packet to the IP address of the extranet in the network address port group translation entry, and keep the source port number unchanged, when the packet sent from the extranet to the intranet is received, translate the target IP address of the packet to the IP address of the intranet in the network address port group translation entry, and keep the target port number unchanged.

The method and device for forwarding a packet which are provided by the embodiments of the present disclosure can translate the packet according to the network address port group translation entry and send the packet in the condition that a matched network address port group translation entry is found according to the source IP address and the source port number of a received packet, or according to the target IP address and the target port number of the received packet. In this way, the received packet can be translated according to a configured network address port group, thereby solving the problem that a lot of resources are occupied by the statically configured NAPT rules and entries, reducing manual maintenance, and reducing resources occupied by sessions.

DETAILED DESCRIPTION OF THE EMBODIMENTS

In the solutions of embodiments of the present disclosure, when the matched network address port group translation entry is found according to the source IP address and the source port number of the received packet, or according to the target IP address and the target port number of the received packet, the packet is translated according to the network address port group translation entry and is then sent out.

The present disclosure is elaborated below in combination with the accompanying drawings and specific embodiments.

Figure 1:
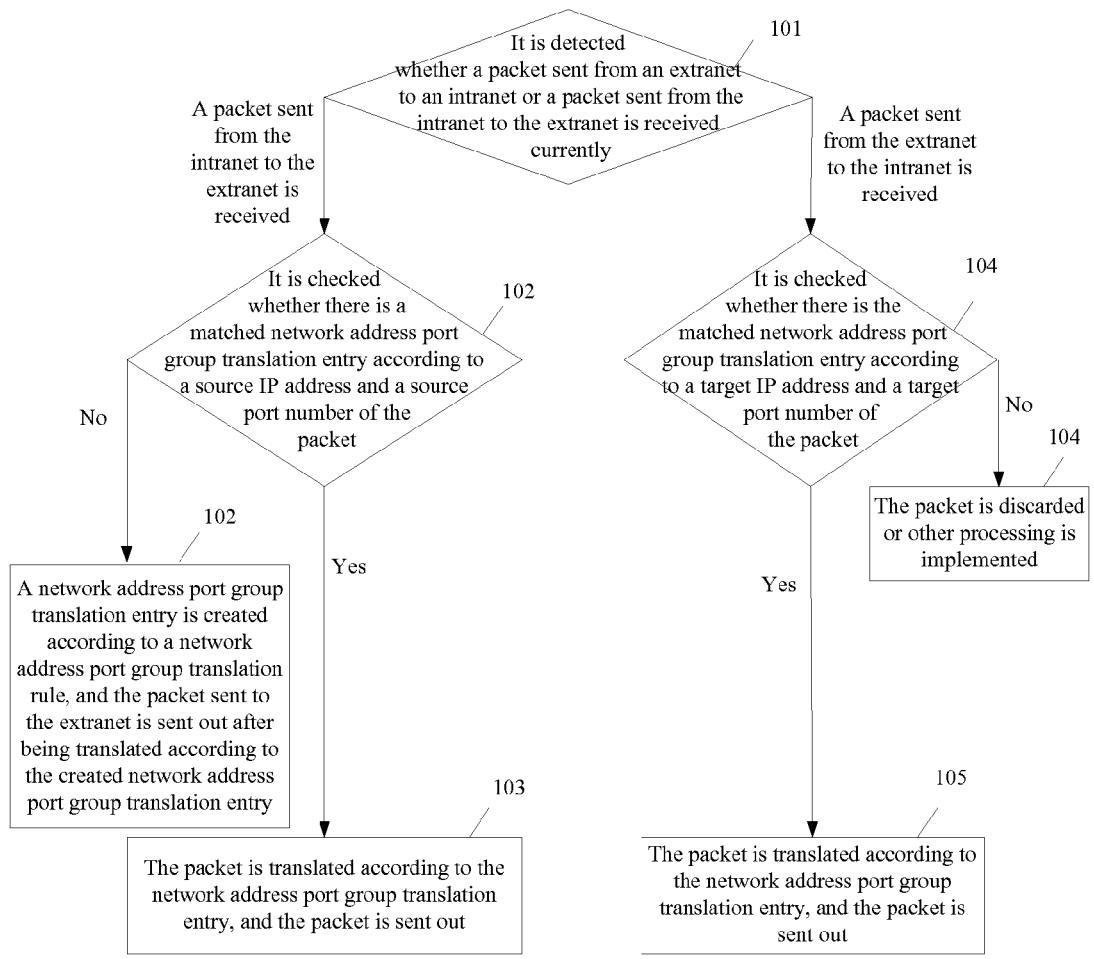
FIG. 1 is a flowchart of a method for forwarding a packet according to an embodiment of the present disclosure.

As shown in FIG. 1, the method for forwarding a packet according to the embodiment of the present disclosure includes the following steps.

Step 101: a Network Address Translation (NAT) device detects whether a packet sent from an extranet to an intranet or a packet sent from an intranet to an extranet is received currently; when the packet sent from the intranet to the extranet is received, Step 102 is executed; when the packet sent from the extranet to the intranet is received, Step 104 is executed.

In this step, the NAT device may adopt various detection schemes to implement the packet detecting function. The embodiments of the present disclosure do not limit the specific implementation mode of detecting the packet. The related technologies of detecting whether the packet sent from the extranet to the intranet or the packet sent from the intranet to the extranet is received currently will not be repeated here.

Step 102: when the packet sent from the intranet to the extranet is received, it is checked whether there is a matched network address port group translation entry according to the source IP address and the source port number of the packet; when the matched network address port group translation entry is found, Step 103 is executed; when the matched network address port group translation entry is not found, a network address port group translation entry is created according to the network address port group translation rule, and the packet sent to the extranet is sent out after being translated according to the created network address port group translation entry; the processing flow ends.

Here, checking whether there is the matched network address port group translation entry according to the source IP address and the source port number of the packet includes that: when the source IP address of the packet is the same as the IP address of the intranet in any network address port group translation entry, and the source port number of the packet is the same as the one port number or within the port number range of the intranet in the network address port group translation entry, then it can be determined that the matched network address port group translation entry of the packet is found.

The network address port group translation entry is a mapping relationship established between an IP address of the intranet and an IP address of the extranet, with one port number or a port number range corresponding to the IP address of the intranet being the same as and in one-to-one correspondence with one port number or a port number range corresponding to the IP address of the extranet. For example, it can be specified that the IP address of the intranet, e.g., 192.168.0.1 and the port number range, e.g., 1-1024 are in one-to-one mapping relationship with the IP address of the extranet, e.g., 10.0.0.1 and the port number range, e.g., 1-1024.

The network address port group translation rule is that: a specified IP address of the intranet and one port number or a port number range corresponding to the specified IP address of the intranet are statically translated to a specified IP address of the extranet and one port number or a port number range which are the same as the one port number or the port number range of the intranet;

or, a specified IP address corresponding to one type of packets in the intranet and one port number or a port number range corresponding to the specified IP address are dynamically translated, under the trigger of a data packet, to any IP address in a specified IP address pool of the extranet and one port number or a port number range which are the same as the one port number or the port number range of the intranet.

Step 103: the packet is translated according to the network address port group translation entry, and the packet is sent out; the processing flow ends.

Here, translating the packet according to the network address port group translation entry includes that: the source IP address of the packet is translated to a preset IP address of the extranet, and the source port number is kept unchanged.

Step 104: when the packet sent from the extranet to the intranet is received, it is checked whether there is the matched network address port group translation entry according to the target IP address and the target port number of the packet; when the matched network address port group translation entry is found, Step 105 is executed; when the matched network address port group translation entry is not found, the packet is discarded or other processing is implemented; the processing flow ends.

Here, checking whether there is the matched network address port group translation entry according to the target IP address and the target port number of the packet includes that: when the target IP address of the packet is the same as the IP address of the extranet in any network address port group translation entry, and the target port number of the packet is the same as the one port number or within the port number range of the extranet in the network address port group translation entry, then it is determined that the matched network address port group translation entry of the packet is found.

Discarding the packet or implementing other processing is defined in related technologies, so it will not be repeated here.

Step 105: the packet is translated according to the network address port group translation entry, and the packet is sent out.

Specifically, the target IP address in the packet is translated to the IP address of the intranet and the target port number is kept unchanged according to the network address port group translation entry, and the packet is sent to the intranet.

Figure 2:
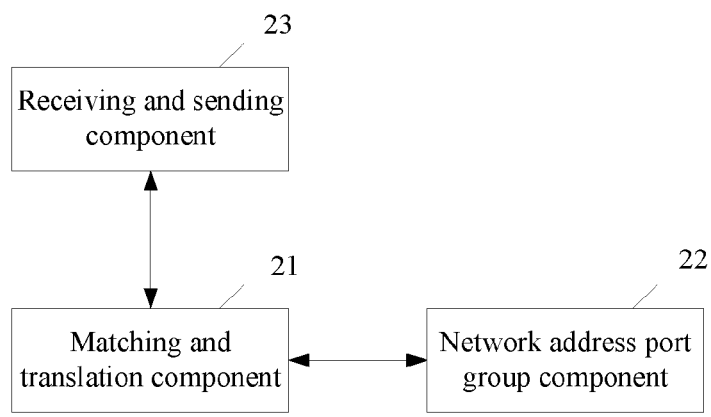
FIG. 2 is a structural diagram of a device for forwarding a packet according to an embodiment of the present disclosure.

As shown in FIG. 2, an embodiment of the present disclosure also provides a traffic distribution device for accessing the Internet. The device includes: a matching and translation component 21, a network address port group component 22 and a receiving and sending component 23; wherein, the matching and translation component 21 is configured to, when a corresponding network address port group translation entry is found from the network address port group component 22 according to a source IP address and a source port number of a received packet, or according to a target IP address and a target port number of the received packet, translate the packet according to the network address port group translation entry, and send the translated packet to the receiving and sending component 23;

the network address port group component 22 is coupled to the matching and translation component 21, and configured to provide the network address port group translation entry for the matching and translation component 21 according to a network address port group translation rule;

the receiving and sending component 23 is coupled to the matching and translation component 21, and configured to send the translated packet which is sent from the matching and translation component 21.

The network address port group component 22 is configured to save, as the network address port group translation entry, a mapping relationship established between an IP address of an intranet and an IP address of an extranet, with one port number or a port number range corresponding to the IP address of the intranet being the same as and in one-to-one correspondence with one port number or a port number range corresponding to the IP address of the extranet.

The matching and translation component 21 is configured to, when the source IP address of the packet is the same as the IP address of the intranet in any network address port group translation entry, and the source port number of the packet is the same as the one port number or within the port number range of the intranet in the network address port group translation entry, determine that the matched network address port group translation entry of the packet is found; or when the target IP address of the packet is the same as the IP address of the extranet in any network address port group translation entry, and the target port number of the packet is the same as the one port number or within the port number range of the extranet in the network address port group translation entry, determine that the matched network address port group translation entry of the packet is found.

The matching and translation component 21 is configured to, when the packet sent from the intranet to the extranet is received, extract the source IP address and the source port number of the packet, and check whether there is the matched network address port group translation entry in the network address port group component 22 according to the source IP address and the source port number of the packet, when the matched network address port group translation entry is found, translate the packet according to the matched network address port group translation entry, when the matched network address port group translation entry is not found, create a network address port group translation entry according to the network address port group translation rule and save the created network address port group translation entry in the network address port group component 22, and translate the packet. The matching and translation component 21 is configured to, when the packet sent from the extranet to the intranet is received, extract the target IP address and the target port number of the packet, and check whether there is the matched network address port group translation entry in the network address port group component 22 according to the target IP address and the target port number of the packet, when the matched network address port group translation entry is found, translate the packet according to the matched network address port group translation entry, when the matched network address port group translation entry is not found, discard the packet or implement other processing.

The matching and translation component 21 is configured to, when the packet sent from the intranet to the extranet is received, translate the source IP address of the packet to the preset IP address of the extranet and keep the source port number unchanged; or when the packet sent from the extranet to the intranet is received, translate the target IP address of the packet to the preset IP address of the intranet and keep the target port number unchanged.

The network address port group component 22 is configured to save the network address port group translation rule; the network address port group translation rule is that: a specified IP address of the intranet and one port number or a port number range corresponding to the specified IP address of the intranet are statically translated to a specified IP address of the extranet and one port number or a port number range which are the same as the one port number or the port number range of the intranet; or, a specified IP address corresponding to one type of packets in the intranet and one port number or a port number range corresponding to the specified IP address are dynamically translated to any IP address in a specified IP address pool of the extranet and one port number or a port number range which are the same as the one port number or the port number range of the intranet.

The specific embodiments of the present disclosure are elaborated below with reference to the accompanying drawings.

Embodiment 1

Figure 3:
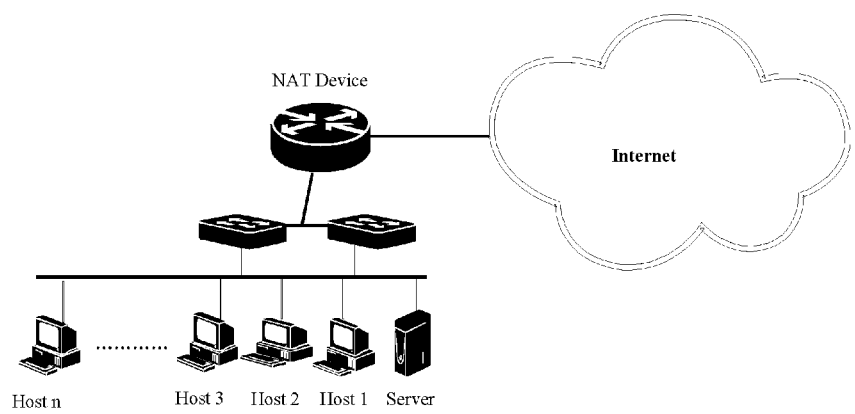
FIG. 3 is a system structure diagram of the embodiment 1 and the embodiment 2 of the present disclosure.

Based on a network constructed according to the structure shown in FIG. 3, the method for forwarding a packet which is provided by this embodiment includes the following steps.

Step 301: the IP address of an intranet server is set as 192.168.0.1, and the IP address of a host 1 is set as 192.168.0.1.

Step 302: the NAT device configures the IP address in the IP address pool of the extranet as 202.1.1.1.

Step 303: a static network address port group translation rule is configured on the NAT device.

The static network address port group translation rule may include that: for an intranet packet whose source IP address is 192.168.0.1 and whose source port number is within the range of 1-1024, the packet is to be translated to the IP address 202.1.1.1 in a certain address pool and the port number range of 1-1024 after the network address port group translation is conducted.

After the rule is configured, the IP address 202.1.1.1 and the port number range <1-1024> are in the mapping relationship with the source IP address 192.168.0.1 and the source port number range <1-1024>, and this mapping relationship serves as the network address port group translation entry.

Step 304: when the NAT device receives an access packet from an Internet user whose source IP address is 202.1.1.1, the target IP address 202.1.1.1 and the target port number 80 of the access packet are extracted; when the matched network address port group translation entry is found, the target IP address of the access packet is replaced with 192.168.0.1, the target port number 80 is kept unchanged, and then the access packet is sent to the intranet.

Step 305: when the NAT device receives a response packet returned by the intranet, the source IP address 192.168.0.1 and the source port number 80 of the response packet are extracted; when the matched network address port group translation entry is found, the source IP address of the response packet is replaced with 202.1.1.1, the source port number 80 is kept unchanged, and then the response packet is sent to the Internet.

Embodiment 2

Based on a network constructed according to the structure shown in FIG. 3, the method for forwarding a packet which is provided by this embodiment includes the following steps.

Step 401: the IP address of the intranet server is set as 192.168.0.1, and the IP address of the host 1 is set as 192.168.0.1.

Step 402: the NAT device configures the IP addresses in the IP address pool of the extranet as 202.1.1.1 and 202.1.1.2.

Step 403: after a dynamic network address port group translation rule is configured on the NAT device, Step 404 and Step 405 are executed.

The dynamic network address port group translation rule may include that: for all the intranet packets whose source IP addresses are in the range from 192.168.0.1 to 192.168.0.254 and the port numbers are in the range from 1 to 1024, the network address port group translation is conducted by performing dynamic translation through the configured IP addresses in the address pool and the corresponding ports.

Step 404: when the NAT device receives from the Intranet a response packet whose source IP address is 192.168.0.1 and the source port number is 80, the source IP address 192.168.0.1 and the source port number 80 of the response packet are extracted according to the dynamic rule in Step 403, the port group translation entry is created by using the address 202.1.1.1 in the address pool according to the dynamic network address port group translation rule, and then the source IP address of the response packet is replaced with 202.1.1.1, and the source port number 80 is kept unchanged, after that, the response packet is sent to the Internet. The processing flow ends.

That is, the IP address 202.1.1.1 and the port number range <1-1024> are in the mapping relationship with the source IP address 192.168.0.1 and the source port number range <1-1024>, and this mapping relationship serves as the network address port group translation entry.

Step 405: when the NAT device receives an access packet from the Internet user whose source IP address is 202.1.1.1, the target IP address 202.1.1.1 and the target port number 80 of the access packet are extracted; when the matched network address port group translation entry is found, the target IP address of the access packet is replaced with 192.168.0.1, the target port number 80 is kept unchanged, and the access packet is sent to the intranet.

The above is only the example embodiments of the present disclosure and not intended to limit the scope of the claims of the present disclosure.

What is claimed is:

1. A method for forwarding a packet, comprising:
when a matched network address port group translation entry is found according to a source Internet Protocol (IP) address and a source port number of a received packet, or according to a target IP address and a target port number of the received packet, translating the packet according to the network address port group translation entry, and sending the packet;
wherein the network address port group translation entry is: a mapping relationship established between an IP address of an intranet and an IP address of an extranet, with one port number or a port number range corresponding to the IP address of the intranet being the same as and in one-to-one correspondence with one port number or a port number range corresponding to the IP address of the extranet;
wherein when the matched network address port group translation entry is found according to the source IP address and the source port number of the received packet, or according to the target IP address and the target port number of the received packet, translating the packet according to the network address port group translation entry comprises: when the packet sent from the intranet to the extranet is received, extracting the source IP address and the source port number of the packet, and checking whether there is the matched network address port group translation entry according to the source IP address and the source port number of the packet; when the matched network address port group translation entry is found, translating the packet according to the matched network address port group translation entry; when the matched network address port group translation entry is not found, creating a network address port group translation entry according to a network address port group translation rule, and translating the packet according to the created network address port group translation entry; when the packet sent from the extranet to the intranet is received, extracting the target IP address and the target port number of the packet, and checking whether there is the matched network address port group translation entry according to the target IP address and the target port number of the packet; when the matched network address port group translation entry is found, translating the packet according to the matched network address port group translation entry; when the matched network address port group translation entry is not found, discarding the packet or implementing other processing.

2. The method as claimed in claim 1, wherein the network address port group translation rule is that:
a specified IP address of the intranet and one port number or a port number range corresponding to the specified IP address of the intranet are statically translated to a specified IP address of the extranet and one port number or a port number range which are the same as the one port number or the port number range of the intranet;
or,
a specified IP address corresponding to one type of packets in the intranet and one port number or a port number range corresponding to the specified IP address are dynamically translated to any IP address in a specified IP address pool of the extranet and one port number or a port number range which are the same as the one port number or the port number range of the intranet.

3. The method as claimed in claim 1, wherein checking whether there is the matched network address port group translation entry according to the source IP address and the source port number of the packet comprises:
when the source IP address of the packet is the same as the IP address of the intranet in any network address port group translation entry, and the source port number of the packet is the same as the one port number or within the port number range of the intranet in the network address port group translation entry, then it is determined that the network address port group translation entry matching the packet is found.

4. The method as claimed in claim 1, wherein checking whether there is the matched network address port group translation entry according to the target IP address and the target port number of the packet comprises:

when the target IP address of the packet is the same as the IP address of the extranet in any network address port group translation entry, and the target port number of the packet is the same as the one port number or within the port number range of the extranet in the network address port group translation entry, then it is determined that the network address port group translation entry matching the packet is found.

5. The method as claimed in claim 1, wherein translating the packet according to the network address port group translation entry comprises:
when the packet sent from the intranet to the extranet is received, translating the source IP address of the packet to the IP address of the extranet in the network address port group translation entry, and keeping the source port number unchanged;
when the packet sent from the extranet to the intranet is received, translating the target IP address of the packet to the IP address of the intranet in the network address port group translation entry, and keeping the target port number unchanged.

6. A device for forwarding a packet, comprising: a matching and translation component, a network address port group component and a receiving and sending component; wherein,
the matching and translation component is configured to, when a corresponding network address port group translation entry is found from the network address port group component according to a source Internet Protocol (IP) address and a source port number of a received packet, or according to a target IP address and a target port number of the received packet, translate the packet according to the network address port group translation entry, and send the translated packet to the receiving and sending component;
the network address port group component is configured to provide the network address port group translation entry for the matching and translation component according to a network address port group translation rule;
the receiving and sending component is configured to send the translated packet which is sent from the matching and translation component;
wherein the network address port group component is configured to save, as the network address port group translation entry, a mapping relationship established between an IP address of an intranet and an IP address of an extranet, with one port number or a port number range corresponding to the IP address of the intranet being the same as and in one-to-one correspondence with one port number or a port number range corresponding to the IP address of the extranet;
wherein the matching and translation component is configured to, when the packet sent from the intranet to the extranet is received, extract the source IP address and the source port number of the packet, and check whether there is the matched network address port group translation entry in the network address port group component according to the source IP address and the source port number of the packet, when the matched network address port group translation entry is found, translate the packet according to the matched network address port group translation entry; when the matched network address port group translation entry is not found, create a network address port group translation entry according to the network address port group translation rule and save the created network address port group translation entry in the network address port group component, and translate the packet according to the created network address port group translation entry; the matching and translation component is configured to, when the packet sent from the extranet to the intranet is received, extract the target IP address and the target port number of the packet, and check whether there is the matched network address port group translation entry in the network address port group component according to the target IP address and the target port number of the packet, when the matched network address port group translation entry is found, translate the packet according to the matched network address port group translation entry; when the matched network address port group translation entry is not found, discard the packet or implement other processing.

7. The device as claimed in claim 6, wherein,
the network address port group component is configured to save the network address port group translation rule;
wherein the network address port group translation rule is that:
a specified IP address of the intranet and one port number or a port number range corresponding to the specified IP address of the intranet are statically translated to a specified IP address of the extranet and one port number or a port number range which are the same as the one port number or the port number range of the intranet;
or,
a specified IP address corresponding to one type of packets in the intranet and one port number or a port number range corresponding to the specified IP address are dynamically translated to any IP address in a specified IP address pool of the extranet and one port number or a port number range which are the same as the one port number or the port number range of the intranet.

8. The device as claimed in claim 6, wherein,
the matching and translation component is configured to, when the source IP address of the packet is the same as the IP address of the intranet in any network address port group translation entry of the network address port group component, and the source port number of the packet is the same as the one port number or within the port number range of the intranet in the network address port group translation entry, determine that the matched network address port group translation entry of the packet is found.

9. The device as claimed in claim 6, wherein,
the matching and translation component is configured to, when the target IP address of the packet is the same as the IP address of the extranet in any network address port group translation entry of the network address port group component, and the target port number of the packet is the same as the one port number or within the port number range of the extranet in the network address port group translation entry, determine that the matched network address port group translation entry of the packet is found.

10. The device as claimed in claim 6, wherein,
the matching and translation component is configured to, when the packet sent from the intranet to the extranet is received, translate the source IP address of the packet to the IP address of the extranet in the network address port group translation entry, and keep the source port number unchanged; when the packet sent from the extranet to the intranet is received, translate the target IP address of the packet to the IP address of the intranet in the network address port group translation entry, and keep the target port number unchanged.

* * * * *